United States Patent
Thakkar et al.

(10) Patent No.: US 6,260,142 B1
(45) Date of Patent: *Jul. 10, 2001

(54) ACCESS AND STORAGE OF SECURE GROUP COMMUNICATION CRYPTOGRAPHIC KEYS

(75) Inventors: Dhanya Thakkar, Kanata; Jacques Montcalm, Hull; Glenn C. Langford, Kanata, all of (CA)

(73) Assignee: Entrust Technologies Limited, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/470,551

(22) Filed: Dec. 22, 1999

Related U.S. Application Data

(60) Division of application No. 09/343,761, filed on Jun. 30, 1999, which is a continuation-in-part of application No. 09/169,242, filed on Oct. 8, 1998.

(51) Int. Cl.[7] .................. H04L 9/32; H04L 9/08
(52) U.S. Cl. .......... 713/158; 713/155; 713/156; 713/175; 380/279; 380/281; 380/282
(58) Field of Search ................ 713/155, 156, 713/158, 175; 380/277, 278, 279, 281, 286, 282

(56) References Cited

U.S. PATENT DOCUMENTS

| | | | | |
|---|---|---|---|---|
| 5,402,490 | * | 3/1995 | Mihm, Jr. | 380/21 |
| 5,663,896 | * | 9/1997 | Aucsmith | 395/187.01 |
| 6,105,134 | * | 8/2000 | Pinder et al. | 713/170 |

OTHER PUBLICATIONS

Schneier, "Applied Cryptography, Second Edition: Protocols, Algorithms, and Source Code in C," Oct. 18, 1995, pp. 84–85.*

* cited by examiner

*Primary Examiner*—Tod Swann
*Assistant Examiner*—Justin T. Darrow
(74) *Attorney, Agent, or Firm*—Vedder, Price, Kaufman & Kammholz

(57) ABSTRACT

A method and apparatus for secure group communication detects the deletion of a member of the group and uses the detected deletion to update the security credentials of a group by updating a repository containing credentials of members of a group. Alternatively, updating of the security credentials may be performed by sending a group credential deletion request for a member that has been deleted from the group so that the member deletes a stored copy of the group security credential.

35 Claims, 4 Drawing Sheets

US 6,260,142 B1

ACCESS AND STORAGE OF SECURE GROUP COMMUNICATION CRYPTOGRAPHIC KEYS

RELATED CO-PENDING APPLICATIONS

This application is a divisional application of related co-pending application filed on Jun. 30, 1999, having Ser. No. 09/343,761, entitled "Access and Storage of Secure Group Communication Cryptographic Keys" by Langford et al., owned by instant assignee and hereby incorporated in its entirety by reference, which is a continuation in part of related to co-pending application filed on Oct. 8, 1998, having Ser. No. 09/169,242, entitled "Method and Apparatus for Secure Group Communications," by Langford et al., owned by instant assignee and hereby incorporated in its entirety by reference.

TECHNICAL FIELD OF THE INVENTION

This invention relates generally to secure communications and more particularly to securing group communications.

BACKGROUND OF THE INVENTION

Securing data, such as digitized voice, digitized video, computer data (e.g., e-mail, files, programs), etc., for transmission may be done in a variety of ways. For example, the data may be encrypted using an encrypted algorithm, such as Data Encryption Standard (DES), and/or a symmetric key. Once the data is encrypted, it is provided to a receiving party, or parties, where each receiving party uses its own copy of the symmetric key to decrypt the encrypted message. The sending and receiving parties may discard the symmetric key after one transmission or use it for a plurality of transmissions. Data secured and transmitted in this manner provides reliable security as long as the symmetric key is known only by the sending and receiving parties. As such, a critical issue with symmetric key encryption is providing the symmetric key to all parties without compromising its security. Note that the security of a symmetric key is compromised when an unauthorized party has obtained it.

Another encryption process utilizes a public/private key pair that includes, for each party, a private decryption key and a public encryption key. For signing, a private signature key and a public signature verification key may be used. The public encryption key and the public signature verification key are publicly available, such that a sending party may obtain the public encryption key for each targeted recipient. Once the public encryption keys are obtained, the sending party individually encrypts a message utilizing the public encryption keys of each recipient. When the recipient receives the encrypted message, it utilizes its private decryption key to the decrypt the message. To further enhance the security of the transmission, the sending party may sign the message using its private signature key. As such, when each recipient receives the encrypted message, it retrieves the public signature verification key of the sending party to authenticate the signature.

To facilitate the transmission of a secure message to a plurality of recipients, the sending party may access a recipient list, which includes the identity of each member of a particular group. For example, in a company, a recipient list may include members of an accounting department, another list for finance, another list for engineering, etc. As such, when a sending party wishes to transmit a secure message to members within its group, it accesses the appropriate recipient list to identity each of the targeted recipients. As known in the art, client software (i.e., the encryption software incorporated into the computer operated by the user), interprets the recipient list, obtains the encryption keys for each of the recipients (typically from a directory) and individually encrypts the message for each.

If the recipient list is relatively small (e.g., approximately 10 or less), the overhead processing of individually encrypting messages for the members identified in the recipient list does not overburden the system. As the number of recipients increases, however, the processing by the client software as well as the amount of data generated increases proportionately. For example, a typical encrypted message is approximately 15 kilobytes in size, while the overhead portion, (i.e., the portion that includes the wrapped session keys for each recipient and the identity of each recipient), may exceed the data size by two-fold, three-fold, ten-fold, etc.

Systems such as those described in above-cited co-pending application entitled "Method and Apparatus for Secure Group Communications" and incorporated herein by reference, provide numerous advantages in facilitating secure group communications. With such systems, a group security credential, such as a cryptographic key, group private decryption key, for example, may be stored with a member's individual security credentials. For example, in a public key infrastructure system, the group communication system may have group security credentials stored in a same file as a member's other private decryption keys and private signing keys. However, as more group keys are generated, the member credential file can become too large. Moreover, if the file is lost or otherwise compromised, the new security credential along with the other member security credentials can be difficult to re-obtain and/or be required to be completely regenerated. In addition, members of a group may be deleted, requiring a suitable update of the security credentials of the group in an efficient manner. This would be useful for large numbers of members.

Consequently, there exists a need for a method for securing group communications that facilitates an on-demand group credential generation as well as suitable group security credential updating techniques to provide an efficient system.

DETAILED DESCRIPTION OF A PREFERRED EMBODIMENT

Briefly, a method and apparatus for secure group communication detects the deletion of a member of the group and uses the detected deletion to update the security credentials of a group by updating a repository containing credentials of members of a group. Alternatively, updating of the security credentials may be performed by sending a group credential deletion request for a member that has been deleted from the group so that the member deletes a stored copy of the group security credential.

The method and apparatus for secure group communication may also provide separate storage of group security credentials and individual group security credentials to provide storage as independent group member credentials. For example, one method includes generating security credentials of a group to initiate a secured group communication, and storing at least a part of the security credentials of the group on a per group basis, separately from individual member security credentials to provide storage as independent group member credentials. If desired, the apparatus and method maintains a history of the stored security credential of the group separately from cryptographic key histories associated with the individual member security credentials. The individual member security credentials may include, for example, at least one private decryption key of a public/private key pair stored in a separate file from the at least part of the security credential of the group.

In addition, the apparatus and method allows on-demand procurement of stored security credentials of a group. A group (e.g., quantity greater than two) is a user entity, objects, such as a device, software processes, routers or any suitable category or entity. In one embodiment, this is done by having a processor store at least a portion of the security credentials of the group in a location accessible from more than one member of the group, such as in an encrypted form in a public directory. Security credentials include at least a cryptographic key used to secure information. Each member may have a dedicated entry containing a group security credential associated with that member. The information may also be stored in a variety of other ways including, for example, storing a composite set of encrypted group security credentials. A member accesses the stored group security credentials on an on-demand basis. For example, at the time of login, at the time of connection to a server, or at any point, under control of a member, the security credential of the group is obtained for the member.

Figure 1:
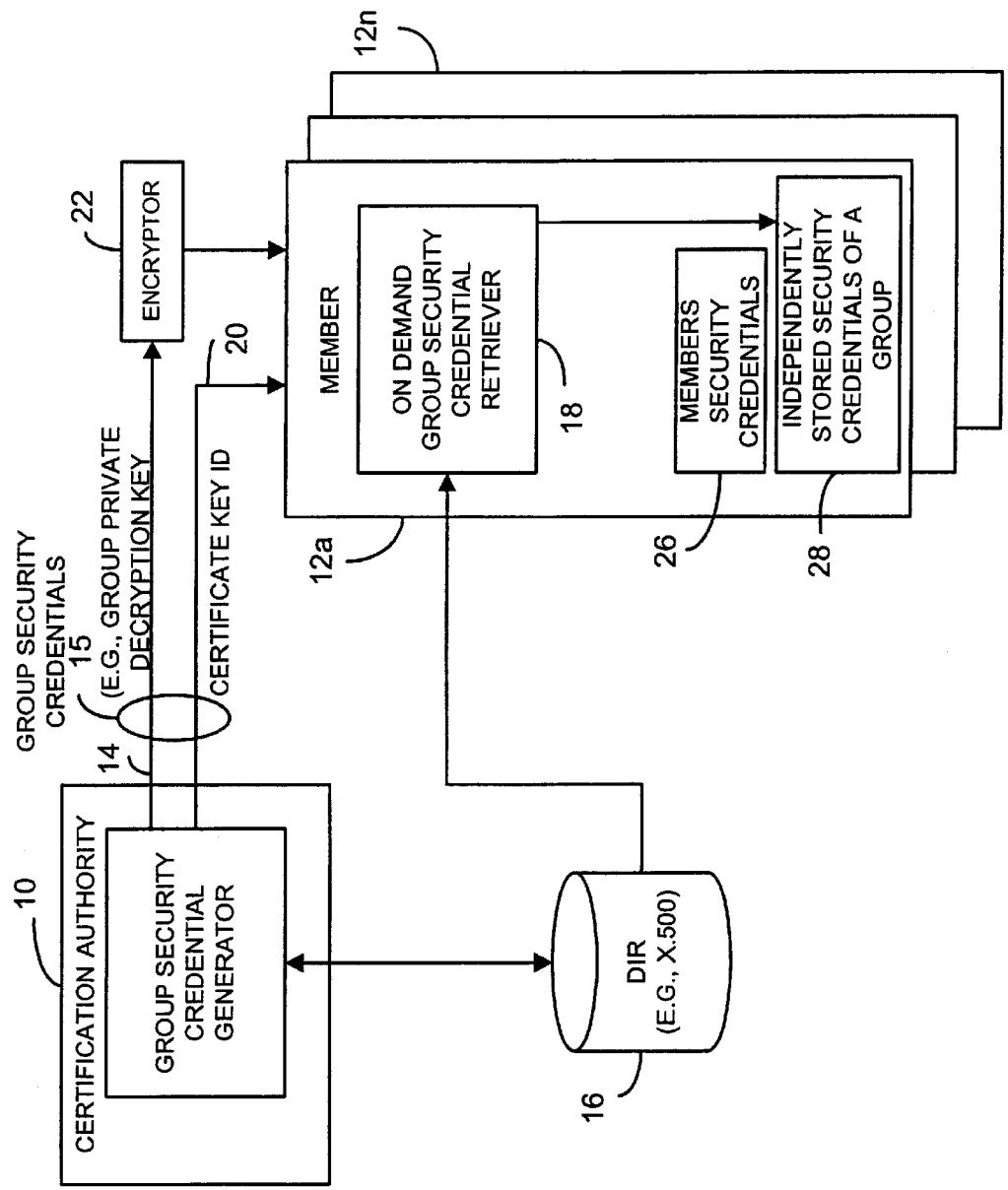
FIG. 1 is a block diagram illustrating one example of an apparatus for providing secure group communication in accordance with one embodiment of the invention.

FIG. 1 illustrates an apparatus for secured group communication that employs a group security credential generator 10, which may, for example, be included as part of a certification authority, server, or other information security provider. The group security credential generator 10 generates group security credentials 15 for a plurality of members of the group. In this embodiment, the members include a plurality of subscribers 12a through 12n, which may be, for example, software applications, network nodes, stand alone units, or any other suitable user of a group security credential. The group security credential generator 10 generates security credentials of a group 14 to initiate a secure group communication among the plurality of members 12a–12n. A stored medium 16 stores at least a portion 14 of the security credentials of the group in a location accessible for more than one member in the group. By way of example, the storage medium 16 may be part of a certification authority that includes the group security credential generator 10, may be a separate storage unit accessible through any suitable network connection such as the Internet or a non-public network, or any other suitable storage unit. In addition, the storage medium 16 may be in the form of a certificate directory such as an X.500-type directory.

Each of the members may be in communication with the storage medium 16 through any suitable communication link that may communicate in any suitable format. For example, the group security credential generator may be part of a Web server or other server and the members may be any suitable software applications or processing units that may communicate in HTTP protocol or in any other suitable format as desired. Each of the members 12a–12n includes an on-demand group security credential retriever 18 which may be, for example, a software module that obtains, on-demand, under control of the respective member of the group, the stored security credentials of the group 14 that are stored in the storage medium 16.

The group security credential generator 10 may be a software module, or any other suitable hardware, firmware or combination thereof. The group security credential generator 10 generates the group security credentials 15 which may include, for example, a private decryption key 14 associated with the group or any other suitable cryptographic key (e.g., symmetric key). Other credentials may include, for example, a certificate key ID 20 which is a unique ID identifying the group, public key certificates or any other suitable data. This may be presented, for example, in a public key certificate corresponding to the group private decryption key. If desired, all or portions of the group security credentials may be encrypted through an optional encryptor 22 which may be any suitable encryption mechanism such as an RSA-based encryption algorithm, elliptic curve-based algorithm or any other suitable algorithm, depending upon whether or not the system employs an asymmetric key infrastructure or a symmetric key based infrastructure.

In this embodiment, a group security credential generator 10 stores at least part of the security credentials (e.g., the group private decryption key) on a per-group basis. The encryptor 22 encrypts on a per-member basis at least a portion of the security credentials of the group, for example, the group private decryption key, and generates a per-member encrypted group credential. For example, each member may have a dedicated set of entries wherein a header identifies the particular member and subsequent entries include the group security decryption private key encrypted with a random symmetric key that is wrapped using the public key associated with the member. Another entry would be dedicated for another member having a copy of the group private decryption. Hence, the storage medium 16 stores the per-member encrypted group credentials on a per-member basis in separate entries. In this embodiment, the encryptor 22 encrypts the group security credential, or at least a portion thereof, on a per-member basis by wrapping at least a portion of generated security credential of the group separately using a public key of each of the plurality of members. In this embodiment the security credentials of a group includes a private group decryption key and a public group encryption key. Also, alternatively if desired, suitable symmetric keys may be used. In addition if desired, any other suitable cryptographic keys may also be used such as signing keys and verification keys.

Each member 12a–12n has memory 28 that stores the group security credentials received from the directory separate from individual member security credentials to provide independent storage of group member credentials. For example, individual member security credentials 26 may be stored in a member profile in the form of a file encrypted using a symmetric key wrapped with a member public key, or encrypted using any suitable password encryption methodology or any other suitable encryption technique. The group security credential 14 obtained from the directory, however, is stored in a separate file, entry (or files) although it may also be stored in the same RAM, ROM or larger storage device. The group security credentials, or portion thereof, may also be suitably encrypted using a symmetric encryption algorithm or asymmetric encryption algorithm or any other suitable encryption technique. As such, the member stores the group security credential independent from member credentials of the group in memory 28. In this embodiment, since each member has a dedicated entry with a separate entry for the group security credential (or separate fields), the amount of data needed to be stored by a given member may be substantially less than if the group private decryption key was wrapped using a header that included all members of the group. In addition, the member 12a–12n uses its storage 28 for maintaining a history of the stored security credentials of the group separate from cryptographic key histories associated with the individual member's security credentials located in location 26. Since the storage of the individual member security credentials is separate from the storage of the group security credential, (e.g., not stored in the same file), a key history of group security credentials may be maintained by a member so that the member may decrypt old e-mail messages or other data, for example, even after the group security credential has been updated or replaced by a new private decryption key, for example.

The on-demand group security credential retriever 18 retrieves a group security credential for a given subscriber from the directory 16 (or server) on demand, namely, when the member logs in, or any time when the member needs to update group credentials.

The group security credential generator 10 may also include a digital signature authentication algorithm to authenticate the member requesting to obtain, on demand, a stored security credential of the group. This is typically done prior to releasing the stored security credential of the group if the group security credentials are not stored for access by the subscribers in a directory. Hence this alternative requires an authentication of a member where, for example, the group private decryption key is not encrypted (or is encrypted during a session communication) prior to storage in a directory. However, the authentication may not be necessary where the group private decryption key is already encrypted through encryptor 22 and stored in an encrypted form in a directory or other format only decrypted by a given member.

Alternatively, the member may communicate using a conventional digital signature based secure session with the generator 10 and/or the directory to provide the group security credentials to the member.

In yet another alternative embodiment, the encryptor 22 may also encrypt the security credential of the group using cryptographic keys (asymmetric key(s), symmetric key(s), a combination thereof or any other suitable key) associated with all members of the group to produce a composite set of encrypted group security credentials for all members such as generating a large header which would include the group private decryption key but using the public key of each of the members. This composite set may then be stored as a composite set in a repository, such a X.500 directory, that is accessible by the members. In this embodiment, the members retrieve the entire composite set and decrypt the group private decryption key using their respective private decryption key as part of member security credential. As such, the on-demand group credential retriever may retrieve for a member, the composite set of encrypted group security credentials from the storage medium 16.

Figure 2:
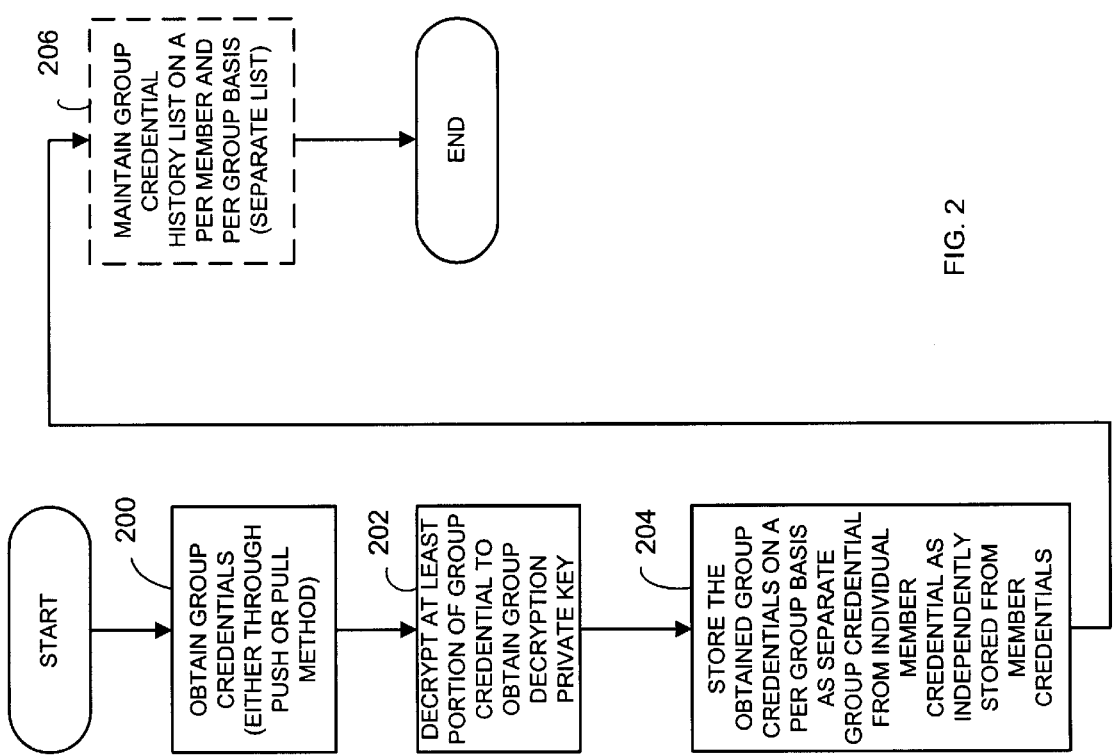
FIG. 2 is a flow chart illustrating a method for secure group communication that stores group credentials on a per group basis as separate group credentials from individual member credential information.

Referring to FIG. 2, a flow chart illustrates a method for secure communication wherein security credentials are stored independently from the individual member security credentials. For example, as shown in block 200, the subscriber may pull (request) the group security credentials 14 and 20 or a portion thereof, namely the group private decryption key 14, from the directory. Alternatively, the group security credential generator may push the newly generated group private decryption key to each of the members upon generation so that the members need not pull the information from the directory. In either case, as shown in block 202, the member decrypts the group security credentials to obtain the group decryption private key. This may be done, for example, using any suitable public key or symmetric key-based decryption algorithms, as known in the art. For example, the member would use its private decryption key corresponding to the public key used to wrap the group private decryption key that was encrypted. Once the group security credentials are decrypted, a member stores the obtained group credentials on a per group basis as separate group credentials in the group security credential memory 28. The member may be a member to a plurality of different groups and as such stores the group credentials on a per group basis. The group credentials are stored on a per group basis separately from the individual member credentials that are stored, for example, in memory location 26. This is shown in block 204. Optionally, as shown in block 206, the member may also maintain a group credential key history on a per-member or per-group basis so that the member may, for example, decrypt older group communications even after the group security credentials have been updated. It may be desirable to revoke one or more of the group keys.

Figure 3:
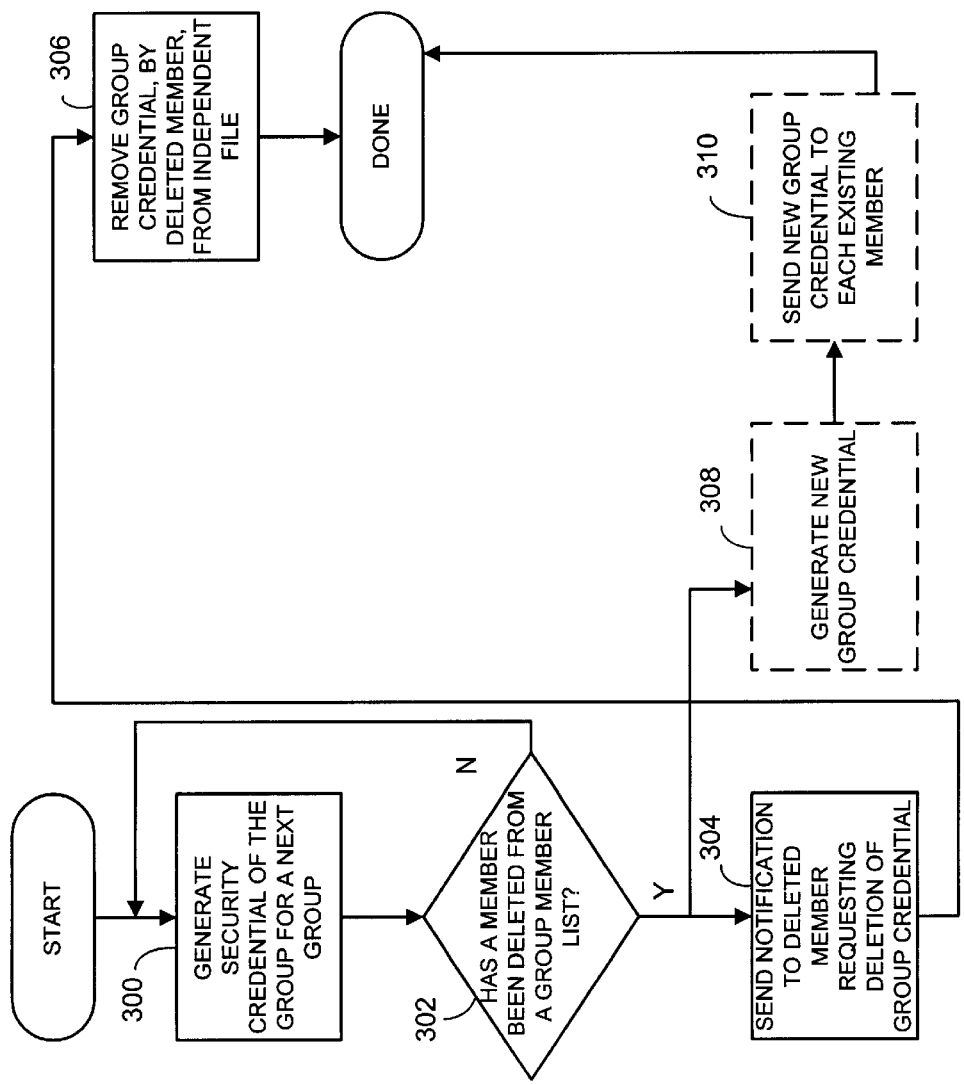
FIG. 3 is a flow chart illustrating an example of a method for secure group communication which sends notification to deleted member requesting deletion of a group credential in accordance with one embodiment of the invention.

As shown in FIG. 3, a flow chart illustrates one embodiment of a secure group communication method used when a member of group is deleted. The group security credential generator performs one of a plurality of different operations. For example, as shown in block 300, the group security credential generator generates the first group credentials. This may be done, for example, as described in co-pending entitled "Method and Apparatus for Secure Group Communications," filed on Oct. 8, 1998, having Ser. No. 09/169,242, owned by instant Assignee, and hereby incorporated by reference. The group security credential generator (or any other suitable entity or process) then determines whether a member of the group has been deleted from a group list as shown in block 302. For example, where the group security credential generator is part of a certification authority, a member of a group may be deleted because the person associated with the member ID has left the company or is otherwise denied access to the particular group. As such, the group list may be updated through a graphic user interface by an operator or automatically deleted from the list through an automatic deletion mechanism based on other policy information identified, for example, in a certificate or through another software control mechanism, if desired. If no member has been deleted from the group list, the group security credential generator continues to generate security credentials for other groups, if necessary. However, if it is determined that a member has been deleted from a group list, the group security credential generator generates a deletion command signal (data) for the member of the group that has been deleted. The member that has been deleted performs deletion of the security credential for the group that was stored by the member. For example, a notification signal may be sent to the member, requesting that the member delete the group security credential from the separate group security storage 28. This is shown in block 304. As shown in block 306, the notified member then removes a group credential from the independent file or location 28. In addition, if desired, as shown in block 308, the group security credential generator may then update the group security credentials by generating a new group private decryption key, for example, and publish it for the remaining members of the group. Also, it will be recognized that updating may include revoking group security credentials. As shown in block 310, the message can then be encrypted using the new group security credentials and sent to each listed member. In this embodiment, a group security credential generator pushes the notification for the member to delete the group security credentials.

Figure 4:
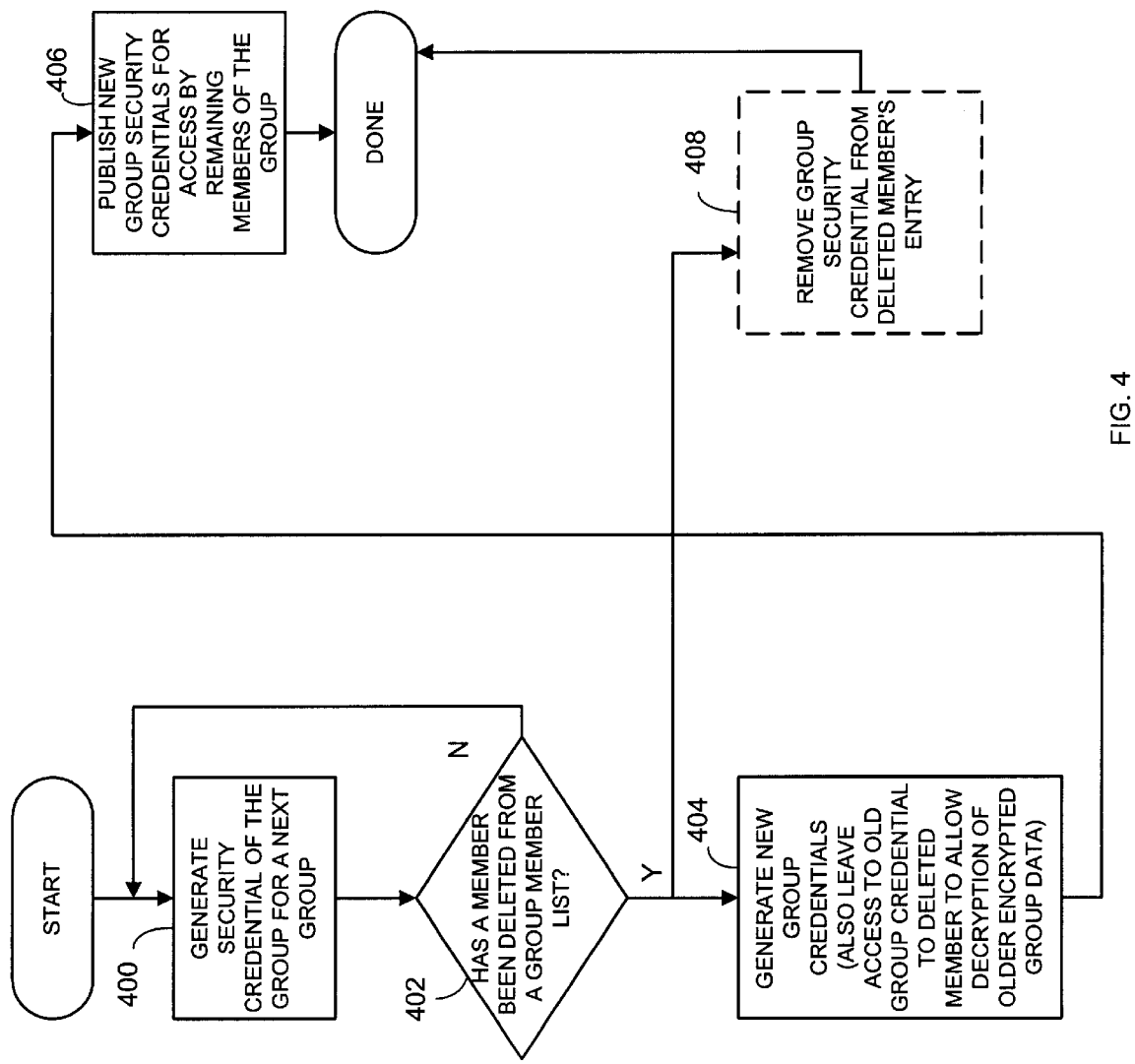
FIG. 4 is a flow chart illustrating a method for secure group communication in accordance with one embodiment of the invention which employs a pull operation from a member's point of view based on the deletion of a member from the group.

Alternatively, as shown in FIG. 4, a pull method for obtaining group security credentials in response to a member being deleted is shown. As shown in block 400, the method includes generating the group security credential. As shown in block 402, if no member has been deleted from the group, additional security credentials may be generated for other groups. However, if a member has been detected as being deleted from a group, such as being removed from a group list, the method includes generating new group credentials, as shown in block 404, while leaving access to old group security credentials for the deleted member. As shown in block 406, the group security credential generator then may publish the new group security credentials in the directory for all members. Each member receiving a message may then poll the directory to obtain a requisite group security credential to decrypt the message, if desired. Alternatively, as shown in block 408, the group security credentials may be simply deleted from the members' sentries in the directory so that when the member removed from the group attempts to obtain (e.g., polls the directory or server) the group security credential, no entries are available. As such, with the methods of FIGS. 3 and 4, the group security credential generator controls the deletion of the security credential of the group for a member in response to determining if the member has been deleted from the group.

In addition, the above-described methods and operations may be performed by one or more processors. These processors may operate in accordance with the invention by reading executable instructions that cause the processors to perform as indicated above. A storage medium or a plurality of storage mediums may contain the executable instructions.

It should be understood that the implementation of other variations and modifications of the invention in its various aspects will be apparent to those of ordinary skill in the art, and that the invention is not limited by the specific embodiments described. For example, it will be recognized that the various functions disclosed herein may be performed by varying components or operations of one or more processors or servers. Also, it will be recognized that a member belonging to more than one group may obtain from the server directory the credentials of more than one group in one request. A directory may store all group credentials for one member as a single encrypted collection of group keys. In addition, dynamic sessions may be used wherein the group key is not copied in storage but discarded after a session. Alternatively, the group key may be stored locally. It is therefore contemplated to cover by the present invention, any and all modifications, variations, or equivalents that fall within the spirit and scope of the basic underlying principles disclosed and claimed herein.

What is claimed is:

1. A method of secure group communication comprising the steps of:
   generating security credentials of a group that include a group public encryption key and a group private decryption key to initiate a secured group communication; and
   controlling deletion of the security credentials of the group, for at least one member, in response to determining that the member has been deleted from the group.

2. The method of claim 1 including the step of generating deletion command data for the at least one member to effect deletion of a security credential for the group by the at least one member.

3. The method of claim 1 including the step of polling, by a member, for at least a portion of group security credentials to determine that the member has been deleted from the group.

4. The method of claim 1 including the step of storing at least a part of the security credentials of the group on a per group basis, separately from individual member security credentials to provide storage as independent group member credentials.

5. The method of claim 4 including the step of maintaining a history of the stored security credentials of the group separately from cryptographic key histories associated with the individual member security credentials.

6. The method of claim 4 wherein the individual member security credentials include at least one private decryption key of a public/private key pair stored in a separate file from the at least part of the security credentials of the group.

7. The method of claim 4 including the steps of
   encrypting on a per member basis, at least a portion of the security credentials of the group to generate per member encrypted group credentials; and
   storing the per member encrypted group credentials on a per member basis in a repository accessible by each member.

8. The method of claim 7 wherein the step of encrypting the group credentials on a per member basis includes the step of wrapping at least a portion of the generated security credentials of the group separately using a public key of each of a plurality of members.

9. The method of claim 8 wherein the security credentials of the group include a private group decryption key and wherein the step of encrypting includes encrypting the private group decryption key using a symmetric key prior to wrapping using the public key of each of the plurality of members.

10. The method of claim 4 including the step of authenticating a member requesting to obtain, on demand, the stored security credentials of the group prior to releasing the stored security credentials of the group.

11. The method of claim 4 including the step of encrypting the security credentials of the group using cryptographic keys associated with all members of the group to produce a composite set of encrypted group security credentials for all members and storing the composite set in a repository accessible by the members.

12. The method of claim 11 including the step of retrieving, for a member, the composite set of encrypted group security credentials from the repository.

13. An apparatus for providing secure group communication comprising:
   means for generating security credentials of a group that include a group public encryption key and a group private decryption key to initiate a secured group communication; and means for controlling deletion of the security credentials of the group, for at least one member, in response to determining that the member has been deleted from the group.

14. The apparatus of claim 13 including means for generating deletion command data for the at least one member to effect deletion of a security credential for the group by the at least one member.

15. The apparatus of claim 13 including means for polling for at least a portion of group security credentials to determine that the member has been deleted from the group.

16. The apparatus of claim 13 including means for storing at least a part of the security credentials of the group on a per group basis, separately from individual member security credentials to provide storage as independent group member credentials.

17. The apparatus of claim 16 including means for maintaining a history of the stored security credentials of the group separately from cryptographic key histories associated with the individual member security credentials.

18. The apparatus of claim 16 wherein the individual member security credentials include at least one private decryption key of a public/private key pair stored in a separate file from the at least part of the security credentials of the group.

19. The apparatus of claim 16 including means for encrypting on a per member basis, at least a portion of the security credentials of the group to generate per member encrypted group credentials; and means for storing the per member encrypted group credentials on a per member basis in a repository accessible by each member.

20. The apparatus of claim 19 wherein the means for encrypting the group credentials on a per member basis wraps at least a portion of the generated security credentials of the group separately using a public key of each of a plurality of members.

21. The apparatus of claim 20 wherein the security credentials of the group include a private group decryption key and wherein the means for encrypting, encrypts the private group decryption key using a symmetric key prior to wrapping using the public key of each of the plurality of members.

22. The apparatus of claim 16 including means for authenticating a member requesting to obtain, on demand, the stored security credentials of the group prior to releasing the stored security credentials of the group.

23. The apparatus of claim 16 including means for encrypting the security credentials of the group using cryptographic keys associated with all members of the group to produce a composite set of encrypted group security credentials for all members and storing the composite set in a repository accessible by the members.

24. A storage medium comprising memory containing executable instructions that when read by a processor, causes one or more processors to:

generate security credentials of a group including a group public encryption key and a group private decryption key to initiate a secured group communication; and control deletion of the security credentials of the group, for at least one member, in response to determining that the member has been deleted from the group.

25. The storage medium of claim 24 including memory containing executable instructions that when read by the one or more processors causes one or more processors to generate deletion command data for the at least one member to effect deletion of a security credential for the group by the at least one member.

26. The storage medium of claim 24 including memory containing executable instructions that when read by the one or more processors causes one or more processors to poll at least a portion of group security credentials to determine that the member has been deleted from the group.

27. The storage medium of claim 24 including memory containing executable instructions that when read by the one or more processors causes one or more processors to store at least a part of the security credentials of the group on a per group basis, separately from individual member security credentials to provide storage as independent group member credentials.

28. The storage medium of claim 27 including memory containing executable instructions that when ready by the one or more processors causes one or more processors to maintain a history of the stored security credentials of the group separately from cryptographic key histories associated with the individual member security credentials.

29. The storage medium of claim 27 wherein the individual member security credentials include at least one private decryption key of a public/private key pair stored in a separate file from the at least part of the credentials of the group.

30. The storage medium of claim 27 including memory containing executable instructions that when read by the one or more processors causes one or more processors to encrypt on a per member basis, at least a portion of the security credentials of the group to generate per member encrypted group credentials; and to store the per member encrypted group credentials on a per member basis in a repository accessible by each member.

31. The storage medium of claim 30 including memory containing executable instructions that when read by the one or more processors causes one or more processors to wrap at least a portion of the generated security credentials of the group separately using a public key of each of a plurality of members.

32. The storage medium of claim 31 wherein the security credentials of the group include a private group decryption key and wherein the storage medium includes memory containing executable instructions that when read by the one or more processors causes one or more processors to encrypt the private group decryption key using a symmetric key prior to wrapping using the public key of each of the plurality of members.

33. The storage medium of claim 27 including memory containing executable instructions that when read by the one or more processors causes one or more processors to authenticate a member requesting to obtain, on demand, the stored security credentials of the group prior to releasing the stored security credentials of the group.

34. The storage medium of claim 27 including memory containing executable instructions that when read by the one or more processors causes one or more processors to encrypt the security credentials of the group using cryptographic keys associated with all members of the group to produce a composite set of encrypted group security credentials for all members and storing the composite set in a repository accessible by the members.

35. The storage medium of claim 33 including memory containing executable instructions that when read by the one or more processors causes one or more processors to retrieve, for a member, the composite set of encrypted group security credentials from the repository.

* * * * *